May 14, 1968   R. ADELL   3,382,616
ORNAMENTAL AND PROTECTIVE MOLDING FOR MOTOR VEHICLE DOORS
Filed May 16, 1966

INVENTOR.
ROBERT ADELL
BY
ATTORNEY

United States Patent Office 3,382,616
Patented May 14, 1968

3,382,616
ORNAMENTAL AND PROTECTIVE MOLDING
FOR MOTOR VEHICLE DOORS
Robert Adell, 350 Billingsgate,
Birmingham, Mich. 48010
Filed May 16, 1966, Ser. No. 550,410
6 Claims. (Cl. 49—462)

ABSTRACT OF THE DISCLOSURE

The ornamental and protective molding is of U-shape in section with its longitudinal shape conforming to the curvature at the door edge. The outer leg of the molding is curled or reversely rolled inwardly and spaced extensions are provided on the inner leg outwardly thereof. The extensions have an aperture through which a screw extends when threaded into a weld nut on the inner face of the door to secure the molding thereon.

Background of the invention

Applicant's Patents 2,831,723 and 2,913,277 disclose moldings for ornamenting and protecting door edges which the present molding patentably distinguishes.

Summary of the invention

The molding strip is made from spring metal and formed into U-shape to provide inner and outer legs with the edge of the outer leg curled or reversely rolled to provide a line engagement with the paint on the front surface of the door to prevent the marring thereof. The rear leg is flat and provided with extensions projecting away from the inner leg in the shape of a box which receive weld nuts on the inner face of the door edge when the strip is mounted thereon. The extensions have apertures through which flat headed screws project for securing the strip positively to the weld nuts on the inner door edge. The curl at the outer leg is spaced from the flat surface of the inner leg an amount less than the thickness of the door edge to provide pressure engagement between the curl and the front face of the door. The longitudinal shape of the strip conforms to the shape of the door edge to have the strip mate with the door edge throughout its length. The front leg of the molding strip is shorter than the rear leg so as to ornament only a very small portion of the door edge.

Figure 1:
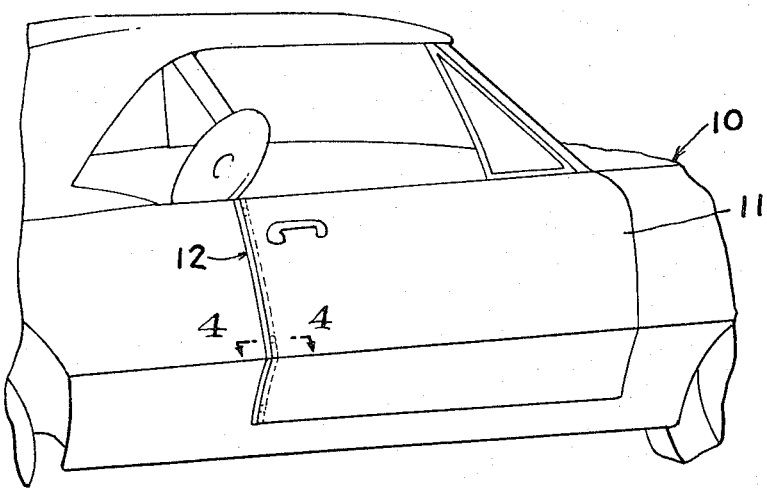
FIG. 1 is a perspective view of a portion of a motor vehicle having a door, the trailing edge of which is provided with an ornamental and protective molding embodying the present invention.

It is to be understood that the invention is not limited in its application to the details of construction and arrangement of parts illustrated in the accompanying drawings, since the invention is capable of other embodiments and of being practiced or carried out in various ways within the scope of the claims. Also, it is to be understood that the phraseology and terminology employed herein is for the purpose of description and not of limitation.

In the drawing there is shown, by way of example, one constructon embodying the present invention. Referring specifically to the drawing, the motor vehicle generally designated by the numeral 10 has a door 11, the trailing edge of which is provided with a molding, generally designated by the numeral 12, secured to the trailing edge of the door 11 with the aid of means disclosed in detail further below.

The trailing edge of the door 11 may be of a conventional construction. As illustrated, said trailing edge comprises an inner door sheet 20 bent to provide a flange 21, with the outer skin sheet 24 of the door 11 wrapped around the flange 21 by bending the edge of the sheet 24 to form a flange 25. Such a construction of the trailing edge of the door is now widely accepted and the connecting means holding the molding thereto is expected to be preferably of a nature that would not require changes in the construction so far described. It should be understood, however, that the thickness of the metal sheets 20 and 24 is approximately .035 of an inch, and, therefore, the combined three thicknesses of metal forming the total thickness of the trailing edge of the door is only slightly over .100 of an inch. Such thickness is not sufficient to accommodate conventional connecting means, such as a screw, unless a through hole is drilled in the edge. Such holes are not desirable as leaving irreparable and unsightly changes in the door edge.

In accordance with the invention, I provide localities of increased thickness on the door edge capable of accommodating positive connecting means, with the molding being shaped in corresponding localities to receive such localities of increased thickness provided on the door edge.

Figure 2:
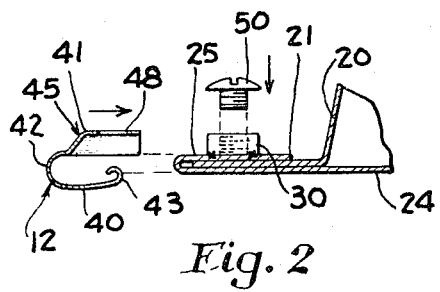
FIG. 2 is an exploded sectional view showing the ornamental and protective molding embodying the present invention, and means for securing the same to the door edge.
Figure 3:
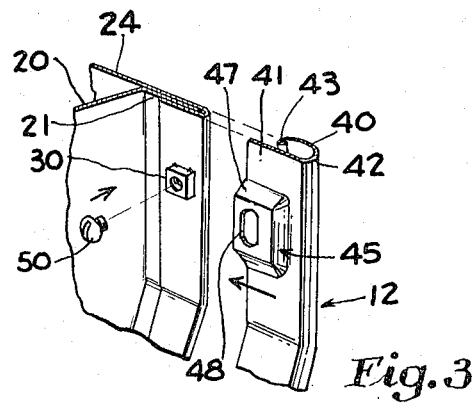
FIG. 3 is a view similar in part to FIG. 2 but showing the same construction in perspective.
Figure 4:
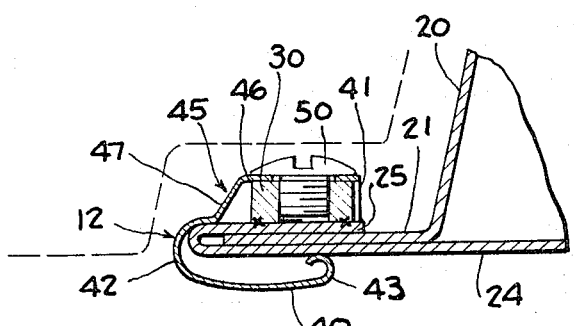
FIG. 4 is a sectional view taken in the direction of arrows on the section plane passing through the section line 4—4 of FIG. 1 and showing the construction of FIGS. 2 and 3 in its assembled condition.

As illustrated in FIGS. 2–4, an element such as a weld nut 30 is welded to the door edge at the inner surface of the flange 25, preferably with the use of a resistance welding method or is secured to the flange 25 in any other suitable manner. It will be understood that a plurality of such weld nuts is provided on the flange 25 in a number and in places determined by the longitudinal configuration of the door edge.

The molding generally designated by the numeral 12 is in the form of a resilient strip of material such as sheet spring steel formed to have a U-shape cross-section and comprises an outer leg 40, an inner leg 41, and a rounded connecting portion 42. A curl 43 is provided on the end of the outer leg 40 in order to protect the finish of the outer skin sheet 24 in installation of the molding.

The U-shape cross-section of the molding 12 is made somewhat narrower than its shape in the installed condition in order that it is spread in installation and embraces the trailing edge of the door exerting on it resilient pressure. This feature is best illustrated in FIG. 2 wherein the curl 43 is shown extending beyond the line of the outer surface of the sheet 24. The longitudinal configuration of the molding 12 substantially corresponds to that of the trailing edge or a portion thereof which the molding is intended to cover.

In each locality on the molding corresponding to or intended to register with that of the weld nuts 30 there are formed outwardly extending extensions or boxes generally designated by the numeral 45 which are in the form of inverted boxes, each having a bottom 46 and three side walls 47. The side of each extension adjacent to the door edge is open, as is best shown in FIGS. 2 and 4 in order to receive the weld nut 30 as the molding 12 is moved on the door edge. A hole 48 is provided in the bottom 46 of each extension for the passage of a threaded connector such as a screw 50. It is of importance that the hole 48 is larger than the diameter of the shank of the screw 50 and, therefore, it compensates for manufacturing variations in the door edge and the molding and enables attaining good fit of the molding on the edge without distorting the molding, which otherwise would be necessary because of misregistry of the threaded hole in the weld nut 30 and the hole in the bottom 46 of the extension.

It will be understood that the above-described construction provides for provision of the protective and ornamental molding either as an optional item or as a standard item on every vehicle. Furthermore, it provides for removal of the molding should it be desired for any reason, leaving no damage or visible traces of its previous installation. For such purposes the weld nuts, such as 30, may be provided on the vehicle as a standard element and no precautions to prevent its spraying with paint in the process of finishing operations on the vehicle need be taken. When installation of the molding is decided upon either in the final assembly of the vehicle or perhaps by the vehicle owner after a period of time of the use of the vehicle on the road, the internal thread of the weld nut 30 may be cleaned prior to installation of the molding with the aid of a bottoming tap, or a screw 30 may be of self-tapping nature.

By virtue of the above construction, the objects of the present invention listed above and numerous additional advantages are attained.

I claim:

1. In an automobile body including a door having a trailing edge of the thickness insufficient to provide a threaded screw hole without drilling the hole through the entire thickness of said trailing edge, a plurality of pieces welded to said trailing edge at the inner surface thereof, a U-shaped ornamental and protective molding having spaced boxes on the inner leg extending away from the outer leg for receiving said pieces, and releasable means securing said boxes to said pieces.

2. The construction defined in claim 1 wherein the pieces are in the form of weld nuts, and the connectors securing the molding to the door edge are in the form of screws.

3. An ornamental and protective molding for an automobile body including a door having a trailing edge, said molding being in the form of a resilient metal strip having a U-shaped cross-section thus adapting said molding to embrace said trailing edge and to cover the same, with the longitudinal configuration of the molding substantially corresponding to that of the portion of the trailing edge which the molding is to cover, said molding including in its cross-sectional configuration an outer leg adapted to engage the outer surface of the trailing edge, and an inner leg adapted to engage the inner surface of the trailing edge; a plurality of spaced threaded nuts welded to the trailing edge at the inner surface thereof a corresponding plurality of exteriorly protruding extensions formed on said inner leg and adapted to receive in the installed condition of the molding the plurality of pieces secured to the inner surface of the door edge, and screws securing the extensions to said nuts.

4. The construction defined in claim 3, wherein said extensions have open sides for passage of said nuts and openings for passage of said screws.

5. In an automobile body including a door having a trailing edge, an ornamental and protective molding for said edge adapted to embrace and cover the same, said molding comprising a resilient metal strip having a U-shape cross-section and longitudinal configuration corresponding to that of said trailing edge and adapted to cover a predetermined longitudinal extent thereof, said molding having cross-section including an outer leg adapted to engage the outer surface of the trailing edge and an inner leg adapted to engage the inner surface of said trailing edge, spaced nuts welded to the trailing edge of the door at the inner surface thereof, spaced extensions in the form of inverted boxes on the inner leg of said molding and having open sides for entry of said nuts upon installation and opening in their bottoms, and a screw for each extension, each of said screws having a shank adapted to pass through the opening provided in the bottom of the respective box to engage the nut, and a head adapted to engage the bottom of the box when the screw is tightened and thus hold the molding in place on the trailing edge.

6. The construction defined in claim 1, wherein the opening in the bottom of each box is appreciably larger than the diameter of the screw shank but smaller than the transverse extent of the screw head in order to compensate for manufacturing variations and ensure proper fitting of the molding on the door edge.

References Cited

UNITED STATES PATENTS

| | | | |
|---|---|---|---|
| 1,925,753 | 9/1933 | Fitch et al. | |
| 2,140,628 | 12/1938 | Hoff | 151—41.7 X |
| 2,268,520 | 12/1941 | Wesley. | |
| 2,831,723 | 4/1958 | Adell | 49—462 |
| 2,837,371 | 6/1958 | McKee | 49—462 |
| 2,902,313 | 9/1959 | Adell | 49—462 |
| 2,913,277 | 11/1959 | Adell | 49—462 |

FOREIGN PATENTS 788,329  12/1957  Great Britain.

DAVID J. WILLIAMOWSKY, *Primary Examiner.*

PHILIP C. KANNAN, *Assistant Examiner.*